United States Patent [19]

Sitton et al.

[11] 4,122,895

[45] Oct. 31, 1978

[54] CORRELATION OF WEIGHTED EFFECT OF DIFFERENT IONS AND SURFACTANT COMPOSITION FOR SURFACTANT FLOOD

[75] Inventors: Donald M. Sitton; Ronald E. Terry, both of Bartlesville, Okla.

[73] Assignee: Phillips Petroleum Company, Bartlesville, Okla.

[21] Appl. No.: 804,122

[22] Filed: Jun. 6, 1977

[51] Int. Cl.² .............................................. E21B 43/22
[52] U.S. Cl. ..................................... 166/252; 166/273
[58] Field of Search ............... 166/252, 273, 274, 275; 252/8.55 D

[56] References Cited

U.S. PATENT DOCUMENTS

| | | | |
|---|---|---|---|
| 3,330,344 | 7/1967 | Reisberg | 166/274 |
| 3,371,710 | 3/1968 | Harvey et al. | 166/273 |
| 3,467,190 | 9/1969 | Dunlap et al. | 166/273 X |
| 3,477,508 | 11/1969 | Hurd | 166/275 X |
| 3,623,553 | 11/1971 | Burdge | 166/274 X |
| 3,637,017 | 1/1972 | Gale et al. | 166/273 X |
| 3,648,770 | 3/1972 | Sydansk et al. | 166/252 |
| 3,677,344 | 7/1972 | Hayes et al. | 166/252 |
| 3,885,628 | 5/1975 | Reed et al. | 166/252 |
| 4,074,755 | 2/1978 | Hill et al. | 166/252 |

*Primary Examiner*—Stephen J. Novosad
*Assistant Examiner*—George A. Suchfield

[57] ABSTRACT

In the recovery of oil from a formation with an aqueous surfactant solution containing an anionic surfactant such as a petroleum sulfonate, a cosurfactant such as tertiary butyl alcohol, and an electrolyte, a specific surfactant system which is suitable for the given formation, is selected by: (1) analyzing the formation brine and determining the total effective $NA^+$ concentration, on the basis that each part $Ca^{++}$ is equivalent to about 14 parts $Na^+$ and each part $Mg^{++}$ is equivalent to about 16 parts $Na^+$; (2) comparing this total effective $Na^+$ concentration with previously prepared phasevolume diagrams of surfactant systems partitioning into separate phases as a function of electrolyte concentration; and (3) adjusting the electrolyte concentration, hydrophobic content of the surfactant, or solubility of the alcohol to give a particularly effective system for recovering oil.

28 Claims, 1 Drawing Figure

CORRELATION OF WEIGHTED EFFECT OF DIFFERENT IONS AND SURFACTANT COMPOSITION FOR SURFACTANT FLOOD

BACKGROUND OF THE INVENTION

This invention relates to the recovery of oil from a subterranean reservoir through the use of surfactant flooding.

It has long been known that the primary recovery of oil from a subterranean formation leaves a substantial amount of the initial oil still in the formation. This has led to the use of what is commonly referred to as secondary recovery or waterflooding wherein a fluid such as brine is injected into a well to force the oil from the pores of the reservoir toward a recovery well. However, this technique also leaves substantial amounts of oil in the reservoir because of the inability of the water to wet the oil and the capillary retention of the oil. Accordingly, it has been suggested to use a surfactant in the waterflooding process. It has been found that the use of surfactants can reduce interfacial tension between the oil and the water to such an extent that substantial increased quantities of oil can be displaced.

Further efforts to better remove residual oil from subterranean deposits have focused on the use of microemulsions. In accordance with this technique, a microemulsion is prepared by mixing oil with brine and surface active agents. This technique, however, is inherently susceptible to many problems. For one thing, it is obviously undesirable to inject oil, which has already been recovered, back into the ground as is done in the conventional use of microemulsion. It is known to simply inject massive amounts of surface active agents into the ground to form a miscible microemulsion but this is not economical. Finally, the surfactant frequently precipitates, thus ending the effectiveness of the microemulsion. This latter phenomenon is frequently associated in the art with the presence of divalent ions such as calcium and magnesium, which are frequently unavoidably present in the formation. While it is possible to remove said divalent ions or excessively high concentrations of monovalent ions by means of preflush, this is undesirable because of the cost involved and should be avoided as much as possible.

SUMMARY OF THE INVENTION

It is an object of this invention to delineate the mechanism behind divalent ion activity and to utilize this mechanism to an advantage; it is a further object of this invention to tailor a surfactant system to the particular characteristics of the oil being recovered and the particular characteristics of the connate water; it is a further object of this invention to avoid the need for preflush in many formations containing a high concentration of divalent ions; it is yet a further object of this invention to provide economical recovery of virtually all of the oil remaining in a formation after a primary recovery; and it is yet a further object of this invention to tailor a surfactant system to the specific oil and connate water in the reservoir to be worked utilizing the principle that calcium and magnesium have an effect approximately equal to 14 and 16 times that of sodium, respectively, and that the effect of increasing salt concentration is equivalent to increasing the hydrophobic content of the surfactant or reducing the alcohol solubility.

In accordance with this invention, a surfactant system is tailored to the formation to be worked utilizing the following relationships: (1) the weighted effect of the calcium and magnesium ions as approximately 14 and 16 times that of sodium ions; (2) equivalent to increasing salt concentration is increasing the hydrophobic content of the surfactant or reducing the water solubility of the cosurfactant; and (3) best oil recovery is achieved with a surfactant system which forms multiple phases on equilibration with the oil over a relatively narrow range of salinity.

BRIEF DESCRIPTION OF THE DRAWING

The drawing, forming a part hereof, is a phase-volume diagram plotting the volume percent of the various phases achieved on equilibrating surfactant and oil as a function of the electrolyte content of the brine.

DESCRIPTION OF THE PREFERRED EMBODIMENTS

Figure 1:
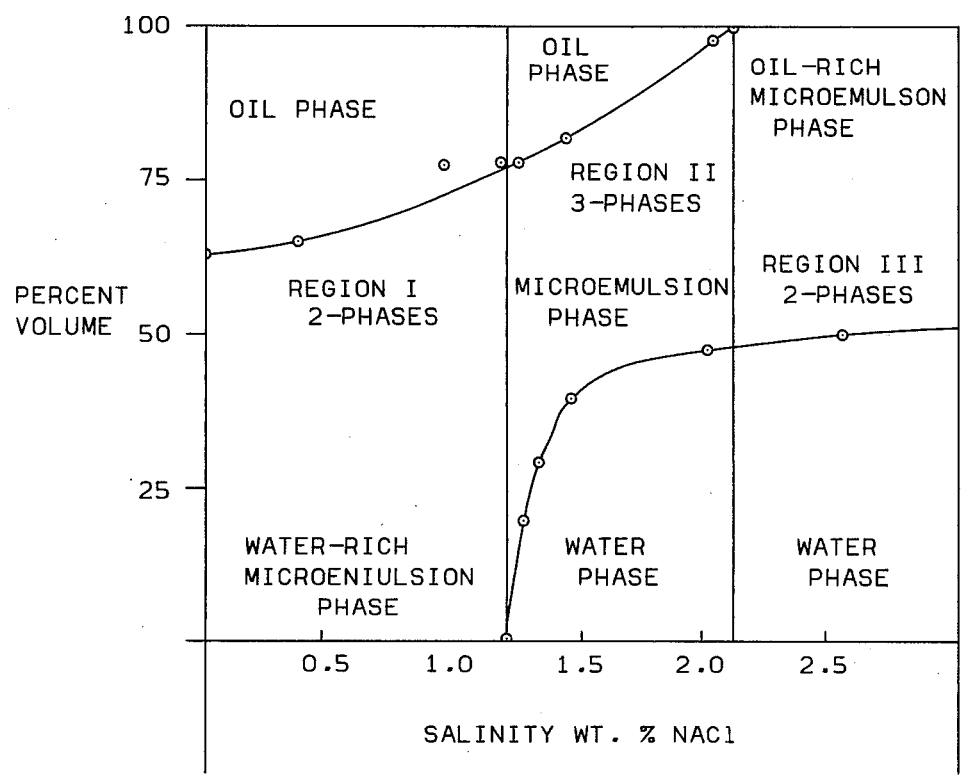

According to the present invention, saline surfactant systems comprising surfactant, water, cosurfactant and electrolytes prepared by using the available make-up water containing both monovalent cations such as $Na^+$ and divalent cations such as $Ca^{++}$ and $Mg^{++}$ are designed for tertiary oil recovery by the following stepwise procedure:

1. Analyzing the available make-up water and determining the total effective NaCl concentration on the basis that each part $Ca^{++}$ and $Mg^{++}$ therein is equivalent to about 14 parts and 16 parts $Na^+$ ion, respectively, by weight.

2. Comparing this total effective NaCl concentration with a series of previously prepared phase-volume diagrams of saline surfactant systems of known effective NaCl concentration made, for instance, using NaCl as the only electrolyte, and 3. Adjusting electrolyte concentrations, surfactant and/or cosurfactant if necessary to give a surfactant system which exhibits behavior associated with high oil recovery on equilibration with oil corresponding to the formation oil.

The surfactant systems associated with high oil recovery are those which give three-phase partitioning as discussed hereinafter and those just adjacent the three-phase partitioning area in systems where the three-phase partitioning occurs over a narrow range of electrolyte concentration, for instance less than 1, preferably less than 0.5 percentage point. That is in these systems partitioning over a narrow range of salinity, either a system giving three-phase partitioning or a system giving two-phase partitioning just outside the three-phase region results in good oil recovery.

Aqueous surfactant systems comprising surfactant, cosurfactant and electrolyte can be characterized by the phase behavior resulting on equilibration of said surfactant systems with oil using a series of surfactant systems differing only in electrolyte concentration. In general, the equilibration of oils such as a crude oil or pure alkanes or mixtures thereof with a series of aqueous surfactant systems containing progressively higher salt concentrations give rise to the following types of phase behavior:

1. Region I: Two Phases (Relatively Low Salinity):

The equilibration of the surfactant system and oil results in an upper phase consisting essentially of oil and a water-rich lower phase microemulsion comprising water, surfactant, oil and cosurfactant.

2. Region II: Three Phases (Intermediate Salinity):

The equilibration of the surfactant system and oil results in an upper phase consisting essentially of oil, a middle phase microemulsion comprising water, oil, surfactant and cosurfactant and a bottom phase comprising water.

3. Region III: Two Phases (Relatively High Salinity):

The equilibration of the surfactant system and oil results in an oil-rich upper phase microemulsion comprising water, oil, surfactant and cosurfactant and a lower phase comprising water.

The above types of phase behavior resulting from the equilibration of surfactant systems with oil can alternately be summarized as shown in Table I.

TABLE I

Phase Behavior in Equilibrated Mixtures of Oil and Saline Surfactant Systems

|  | Region I | Region II | Region III |
|---|---|---|---|
|  | Relatively Low Salinity | Intermediate Salinity | Relatively High Salinity |
| No. of Phases | Two | Three | Two |
| Upper Phase | Predominately Oil | Predominately Oil | Oil-Rich Microemulsion |
| Middle Phase | None | Microemulsion comprising water, oil, surfactant and cosurfactant | None |
| Bottom Phase | Water-Rich Microemulsion | Predominately Water | Predominately Water |

For purposes of this disclosure, Region I (upper oil phase; lower microemulsion phase) is referred to as the two-phase gamma region; Region II (upper oil phase; middle microemulsion phase; bottom water phase) is referred to as the three-phase beta region; and Region III (upper microemulsion phase; lower water phase) is referred to as the two-phase alpha region.

Equilibration of 15 ml aliquots of n-dodecane with 25 ml samples of twelve surfactant systems differing only in NaCl concentration gave the phase behavior described by the data in Table II. The surfactant systems were prepared by mixing 5 g of petroleum sulfonate (average equivalent weight 392), 1.5 g of commercially available mixed primary amyl alcohols and the necessary amount of NaCl and water to obtain the salt concentrations reported in Table II. The equilibrations were carried out in glass-stoppered graduated cylinders at ambient temperature. The surfactant system-oil mixtures were shaken briefly by hand and then allowed to stand about 24 hours before the volumes of the various phases were noted and recorded in Table II. The shaking step is not critical and can be done by hand or mechanical agitation. While 24 hours was allowed for equilibration, two hours or less is generally sufficient.

The phase-volume diagram in FIG. 1 was constructed by use of the equilibration data in Table II. The volume percents listed in Table II were plotted against the salinities of the surfactant systems to give the phase-volume diagram of FIG. 1. Referring to FIG. 1, it can be seen that the two-phase gamma region exists over the range of about 1.30 weight percent NaCl to about 2.1 weight percent NaCl, and the two-phase alpha region exists at salinities greater than about 2.1 weight percent NaCl.

A series of surfactant systems was prepared by mixing 5 g of petroleum sulfonate (average equivalent weight 405), 4 g tert-butyl alcohol cosurfactant and distilled water with sufficient NaCl to give the salt concentrations listed in Table III. A cosurfactant with a relatively high water solubility was used because of the relatively high salinity used. Additional sets of surfactant systems were also prepared with $CaCl_2$ and $MgCl_2$. Each surfactant system was equilibrated with crude oil from the South Cowden field in Ector County, Texas and the phase behavior noted (see Table III). In this table each entry under the headings $Na^+$, $Ca^{++}$, and $Mg^{++}$ is a separate run. For instance, in the fifth line down, the last systems giving gamma behavior were with either 11,400 $Na^+$ or 800 $Ca^{++}$, or 600 $Mg^{++}$. Thus, there are 26 separate runs shown, not 13.

TABLE III

Phase Behavior of Equilibrated Mixtures of South Cowden Crude Oil and a Series of Surfactant Systems With Different Elctrolytes

| Electrolyte (ppm) | | | No. of | |
|---|---|---|---|---|
| $Na^+$ | $Ca^{++}$ | $Mg^{++}$ | Phases | Phase-Volume Region |
| 3900 | | | 2 | Gamma |
| 7900 | | | 2 | Gamma |
| 9800 | | | 2 | Gamma |
| 10800 | | 500 | 2 | Gamma |
| 11400 | 800 | 600 | 2 | Gamma |
| 11800 | 900 | 700 | 3 | Beta |
| 13800 | 1000 | 750 | 3 | Beta |
| 15700 | 1100 | 800 | 2 | Beta |
| 16700 | 1200 | 900 | 2 | Beta |
| | | 1000 | 3 | Beta |
| | | 1100 | 3 | Beta |
| | | 1200 | 3 | Beta |
| 17700 | 1250 | 1300 | 2 | Alpha |

TABLE II

SURFACTANT SYSTEM: 5% SULFONATE/ 1.5% MIXED AMYL ALCOHOLS

| System No. | No. Phases | Wt. % NaCl | Volume of Phases | | | Total Volume | Volume Fractions | | | Volume Percent | | | Volume Percent Middle + Bottom |
|---|---|---|---|---|---|---|---|---|---|---|---|---|---|
|  |  |  | Top | Middle | Bottom |  | Top | Middle | Bottom | Top | Middle | Bottom |  |
| 1 | 2 | 0.0 | 15.0 | None | 25.0 | 40.0 | 0.375 | None | 0.625 | 37.5 | None | 62.5 | 62.5 |
| 2 | 2 | 0.5 | 14.0 | None | 26.0 | 40.0 | 0.350 | None | 0.650 | 35.0 | None | 65.0 | 65.0 |
| 3 | 2 | 1.0 | 9.0 | None | 31.0 | 40.0 | 0.225 | None | 0.775 | 22.5 | None | 77.5 | 77.5 |
| 4 | 2 | 1.1 | 10.0 | None | 30.0 | 40.0 | 0.250 | None | 0.750 | 25.0 | None | 75.0 | 75.0 |
| 5 | 2 | 1.2 | 9.0 | None | 31.0 | 40.0 | 0.225 | None | 0.775 | 22.5 | None | 77.5 | 77.5 |
| 6 | 3 | 1.30 | 9.0 | 22.0 | 9.0 | 40.0 | 0.225 | 0.550 | 0.225 | 22.5 | 55.0 | 22.5 | 77.5 |
| 7 | 3 | 1.40 | 9.0 | 17.5 | 13.5 | 40.0 | 0.225 | 0.437 | 0.338 | 22.5 | 43.7 | 33.8 | 77.5 |
| 8 | 3 | 1.50 | 7.0 | 16.5 | 16.5 | 40.0 | 0.174 | 0.413 | 0.413 | 17.4 | 41.3 | 41.3 | 82.6 |
| 9 | 3 | 2.0 | 2.0 | 19.0 | 19.0 | 40.0 | 0.050 | 0.475 | 0.475 | 5.0 | 47.5 | 47.5 | 95.0 |
| 10 | 2 | 2.1 | 20.5 | None | 19.5 | 40.0 | 0.513 | None | 0.487 | 51.3 | None | 48.7 | 48.7 |
| 11 | 2 | 2.2 | 20.0 | None | 20.0 | 40.0 | 0.500 | None | 0.500 | 50.0 | None | 50.0 | 50.0 |
| 12 | 2 | 2.3 | 20.0 | None | 20.0 | 40.0 | 0.500 | None | 0.500 | 50.0 | None | 50.0 | 50.0 |
| 13 | 2 | 2.4 | 20.0 | None | 20.0 | 40.0 | 0.500 | None | 0.500 | 50.0 | None | 50.0 | 50.0 |

Referring to Table III, the "effective $Na^+$ concentration" of the $Mg^{++}$ and $Ca^{++}$ systems can be calculated by considering the adjacent salt concentration points in the gamma-beta transition zone and the adjacent salt concentration points in the beta-alpha transition zone. The following calculations are representative:

(A) Gamma-Beta Transition Zone (i)
$Na^+/Ca^{++} = 11400/800 = 14.25$
$Na^+/Ca^{++} = 11800/900 = 13.11$
$Na^+/Ca^{++}$ (average) $= 13.68$ (ii)
$Na^+/Mg^{++} = 11400/600 = 19.00$
$Na^+/Mg^{++} = 11800/700 = 16.86$
$Na^+/Mg^{++}$ (average) $= 17.93$ (B) Beta-Alpha Transition Zone (i)
$Na^+/Ca^{++} = 16700/1200 = 13.92$
$Na^+/Ca^{++} = 17700/1250 = 14.16$
$Na^+/Ca^{++}$ (average) $= 14.04$ (ii)
$Na^+/Mg^{++} = 16700/1200 = 13.92$
$Na^+/Mg^{++} = 17700/1300 = 13.62$
$Na^+/Mg^{++}$ (average) $= 13.77$ The above calculations illustrate that approximately 14 parts by weight $Na^+$ should be effectively equivalent to 1 part by weight $Ca^{++}$. The $Na^+/Mg^{++}$ ratios over the two transition zones are not as consistent as the $Na^+/Ca^{++}$ ratios, however, averaging the values 17.93 and 13.77 gives approximately 16 parts by weight $Na^+$ for one part $Mg^{++}$. The results of these calculations confirm the inventive ranges suggested hereinabove for relating the actual concentrations of $Mg^{++}$ and $Ca^{++}$ in makeup water with an effective $Na^+$ concentration in an aqueous NaCl solution.

The inventive relationship was further shown to be additive by the following data:

| $Na^{+(ppm)}$ | + | $Ca^{++}$ (ppm) | = | $Na^+$ Equivalence (ppm) | Phase-Volume Region |
|---|---|---|---|---|---|
| 5,500 | | 400 | | 11,100 [(14 × 400) + 5,500] | Gamma |
| 5,900 | | 500 | | 12,900 [(14 × 500) + 5,900] | Beta |
| 6,300 | | 500 | | 13,300 [(14 × 500) + 6,300] | Beta |

The indicated mixtures of $NaCl$ and $CaCl_2$ were formulated into surfactant systems and the phase-behavior resulting from equilibration of said systems with crude oil observed was consistent with that observed in the NaCl-containing surfactant systems of Table III.

The utility of the present process is further demonstrated by the use of Hendricks Reef water as a make-up water for preparing surfactant systems. Said water has the following actual analysis corresponding to the indicated effective $Na^+$ concentration:

| Actual Analysis (ppm) | | $Na^+$ $^{Equivalence\ (ppm)}$ |
|---|---|---|
| $Na^+$ | 1634 | 1634 |
| $Ca^{++}$ | 744 | 10416 (14 × 744) |
| $Mg^{++}$ | 276 | 4416 (16 × 276) |
| | | Total: 16466 ppm ("Effective" $Na^+$ Concentration of Hendricks Reef water) |

Thus, the phase behavior of surfactant systems (derived from Hendricks Reef water) equilibrated with South Cowden crude oil should approximate that of similar systems containing about 16500 ppm $Na^+$. This was verified by preparing a surfactant system comprising 5 weight percent petroleum sulfonate (average equivalent weight 405), 4 weight percent tert-butyl alcohol and 91 weight percent Hendricks Reef water. Equilibration of this system with South Cowden crude oil resulted in three-phase beta behavior as expected in view of the data in Table III using, e.g., the same surfactant system with 15,700 ppm $Na^+$ and 16,700 ppm $Na^+$, each of which exhibited three-phase behavior. Thus, it can be seen that the available Hendricks Reef water can be used with the specified surfactant-cosurfactant combination to give a suitable system for tertiary oil recovery of South Cowden crude.

In the above discussion, if the sodium equivalence had corresponded to the two-phase alpha region, several options could have been exercised to "shift" to the three-phase beta region:

1. Use of a less saline make-up water (if available),
2. Use of a surfactant having a lesser hydrophobic portion (i.e., a lower equivalent weight sulfonate) in the surfactant system,
3. Use of a more water-soluble alcohol cosurfactant in the surfactant system.

If the sodium equivalence had corresponded to the two-phase gamma region, the following options could have been exercised to "shift" to the three-phase beta region:

1(a). Use of a more saline make-up water (if available) or addition of electrolyte to the available water for the surfactant system,
2(a). Use of a surfactant having a greater hydrophobic portion (i.e., a higher equivalent weight sulfonate) for the surfactant system,
3(a). Use of a less water-soluble alcohol for the surfactant system.

As a practical matter, the use of alternative 1 is least desirable because less saline water is frequently not available and even if it is a preflush with a brine roughly corresponding to that of the surfactant system would generally be required. The 1(a) alternative is entirely feasible from a practical standpoint since it is a simple matter to add salt to the water. The most significant feature is that water containing divalent ions can be utilized in accordance with this invention as a result of the understanding of the weighted effect of these ions.

In instances where the divalent ion component of the make-up water is less than 500 parts per million by weight based on the weight of the water, preferably less than 200, more preferably less than 100, the use of the invention allows use of the water with any of the disclosed surfactants. With greater amounts of divalent ions, it is generally preferred to use a mixed surfactant system as is known in the art to avoid excessive loss of the surfactant. Such mixed surfactant systems are shown in Wilchester et al, U.S. Pat. No. 3,990,515, the disclosure of which is hereby incorporated by reference.

The term "make-up water" as used herein refers to the water utilized to formulate the surfactant-cosurfactant-brine system preparatory to injecting same into the ground. This water may be the connate or formation water which can be used without modification in many instances by adjusting the surfactant and cosurfactant as set out herein or by simply adding additional salt if such is needed. Alternatively, this water can be from a separate source such as a river if such is conveniently located so as to be practical.

Suitable surfactants include anionic surfactants, preferably a petroleum sulfonate having an average equivalent weight within the range of 375 to 500, preferably about 390 to 425. These sulfonates are well known in the art and are sometimes referred to as alkylaryl sulfonates. They are also sometimes referred to as petroleum mahogany sulfonates. They may be complex mixture of components including aryl sulfonates and alkaryl sulfonates with a mixture consisting mostly of monosulfonates having one —$SO_3Na$ (or —K or —$NH_4$) group per molecule. These individual hydrocarbon sulfonates, for example, can include the following compounds: ammonium, sodium or potassium dodecylbenzene sulfonates ($C_{18}H_{29}SO_3M$); alkane sulfonates such as octadecane sulfonate ($C_{18}H_{29}SO_3M$); and phenylalkane sulfonates such as phenyldodecane sulfonate ($C_{18}H_{29}SO_3M$). As used herein, the term "equivalent weight" is used in the usual manner and in the case of pure monosulfonates, the equivalent weight equals the molecular weight, whereas the equivalent weight of disulfonates is equal to one-half the molecular weight. Sulfonates can be produced in the manner known in the art by the treatment of appropriate oil feedstocks with sulfuric acid and neutralizing with an alkali metal or ammonium hydroxide. The equivalent weights referred to are, as noted, average equivalent weights and there may be present significant amounts of sulfonates having an equivalent weight as low as 200 and as high as 650. While petroleum sulfonates are preferred, other suitable surfactants include aminocarboxylates such as n-laurylsarcosinate, alkyl sulfates such as n-lauryl sulfate, and phosphate esters such as di(2-ethylhexyl) phosphate. The surfactant is used within an amount in the range of 1-7, preferably 2-5 wt. % active ingredient, based on the weight of the water.

The cosurfactant can be any alcohol, amide, amine, ester, aldehyde or ketone containing 1-20 carbon atoms and preferably having a solubility in water within the range of 0.5 to 20, preferably 2 to 10 grams per 100 grams of water. Preferred materials are the $C_4$ to $C_7$ alkanols or mixtures thereof. Most preferred are $C_4$ and $C_5$ alcohols having a solubility within the above range. Isobutyl alcohol with a solubility of 9.5 grams per 100 grams of water is particularly suitable. Other preferred cosurfactants include secondary butyl alcohol, n-butyl alcohol, n-amyl and isoamyl alcohol. Alcohols such as isopropyl, which are known in the art to be useful in surfactant flooding systems generally are not as suitable for use in this invention because of the high solubility in water which requires going to extremely high salt concentration and/or extremely high sulfonate equivalent weight to give an operable system. However, in instances where the salt concentration is unavoidably high, such alcohols may be used. Particularly with certain oils which interact with surfactant systems in the manner of a higher molecular weight straight chain alkane, a very high equivalent weight sulfonate may be required and if a low salt concentration is undesirable for some reason, then isopropyl alcohol or another highly water-soluble cosurfactant should be used. The cosurfactant generally is utilized in an amount within the range of 1-12, preferably 3-9 wt. %, based on the weight of the water.

The brine usually constitutes 85-95 wt. % of the total injected composition including brine, surfactant and cosurfactant. The electrolyte is generally present in an amount within the range of 800 to 20,000 weight equivalents $Na^+$ based on the weight of water. That is, after all of the salts have been converted to $Na^+$ equivalent, it is the weight of that much sodium, as opposed to NaCl, that is used to give the ppm $Na^+$ weight equivalents.

In order to practice the present invention on a given reservoir, a specific NaCl-containing aqueous surfactant system is equilibrated with the reservoir crude oil over a range of salinities so that a typical phase-volume diagram can be plotted from the equilibration data as described hereinabove. The three-phase beta region for said crude oil and the specific surfactant system examined is thus defined as a salinity range, e.g., 10,000-15,000 ppm $Na^+$. The effective $Na^+$ concentration of the available make-up water is then determined by multiplying the $Ca^{++}$ concentration by 14 and the $Mg^{++}$ concentration by 16 and totaling these quantities with the actual $Na^+$ concentration. If, for example, this effective $Na^+$ concentration is 14,000, a value within the range of 10,000-15,000 ppm $Na^+$, the specific surfactant system mentioned above as giving three-phase partitioning over a 10,000-15,000 ppm range of $Na^+$ concentration is suitable for use. However, if the effective $Na^+$ concentration is outside the 10,000-15,000 ppm range, then an alternate surfactant system must be designed by use of the above-cited options.

As a case in point, it can be assumed that only one make-up water, e.g., 14,000 ppm effective $Na^+$ concentration is available. A candidate aqueous surfactant system (A) containing NaCl and cosurfactant is equilibrated with the reservoir crude oil over a range of $Na^+$ concentrations to give a three-phase beta region corresponding to 4,000-8,000 ppm salinity. Since the range 4,000-8,000 ppm salinity does not encompass the value 14,000, said surfactant system (A) is not suitable. An alternate candidate surfactant system (B) containing either a more water-soluble alcohol or a lower equivalent weight sulfonate than surfactant system (A) is required. Thus, a candidate aqueous surfactant system (B), e.g., containing NaCl and a more water-soluble alcohol cosurfactant, is equilibrated with the reservoir crude oil over a range of $Na^+$ concentrations to give a three-phase beta region corresponding to 9,000-15,000 ppm salinity. Since the 14,000 ppm effective $Na^+$ concentration of the available make-up water is a value within said range, the surfactant system (B) is suitable for tertiary oil recovery in said hypothetical reservoir.

By similar reasoning, an aqueous surfactant system (C) containing NaCl and cosurfactant is considered for use in the above-mentioned reservoir. For example, said surfactant system (C) is equilibrated with crude oil over a range of $Na^+$ concentrations to give a three-phase beta region corresponding to 16,000-20,000 ppm salinity. Since the effective $Na^+$ concentration of the make-up water, e.g., 14,000 ppm, is not within the range of 16,000-20,000 ppm, said surfactant system (C) is not suitable for tertiary oil recovery in said hypothetical reservoir. Thus, an alternate surfactant system (D) containing either a less water-soluble alcohol or a higher equivalent weight sulfonate is required. An aqueous surfactant system (D), e.g., containing NaCl and a less water-soluble alcohol cosurfactant, is equilibrated with the reservoir crude oil over a range of $Na^+$ concentrations to give a three-phase beta region corresponding to 12,000-17,000 ppm salinity. Since the 14,000 ppm effective $Na^+$ concentration of said available make-up water is within the range of 12,000-17,000 ppm, the surfactant system (D) would be suitable for tertiary oil recovery in said hypothetical reservoir.

In accordance with the principles of the present invention, surfactant systems can be designed using the proper surfactant and cosurfactant so as to adjust surfactant-crude oil equilibrations to any of the desired multi-phase regions depicted by phase-volume diagrams utilizing field make-up water.

A mobility buffer is generally injected behind the surfactant system. Examples of useful mobility buffers include aqueous and non-aqueous fluids containing mobility-reducing agents such as high molecular weight partially hydrolyzed polyacrylamides, polysaccharides, soluble cellulose ethers, and the like. The mobility buffer comprises 50–20,000, preferably 200–5,000 parts per million of said mobility reducing agent in said fluid. The mobility buffer can be graded, that is, its concentration can be relatively high at the leading edge and relatively low at the trailing edge. For instance, the mobility buffer can start at 2500 ppm and end at 250 ppm. These mobility buffers are known in the art.

Finally, a drive fluid is injected behind the mobility buffer through at least one injection well to force oil contained in the reservoir toward at least one recovery well. The drive material can be aqueous or non-aqueous and can be a liquid, gas or a combination of the two. Generally, it is a formation water or similar thereto. When a hard brine is the drive liquid, it can be beneficial to precede the brine with a slug of relatively fresh water.

If a preflush is utilized, it will generally be utilized in an amount within the range of 0.01 to 2.0, preferably 0.25 to 1 pore volume, based on the pore volumes of the total formation being treated. The surfactant system is injected in an amount within the range of about 0.001 to 1, preferably 0.01 to 0.25 pore volume based on the pore volume of the total formation being treated. The mobility buffer is injected in an amount within the range of about 0.001 to 1.0, preferably 0.01 to 0.25 pore volume, based on the pore volume of the total formation. The drive fluid simply is injected until all feasible recovery of the oil has been made.

While the invention has been described in detail for the purpose of illustration, it is not to be construed as limited thereby, but is intended to cover all changes and modifications within the spirit and scope thereof.

We claim:

1. A method for forming a surfactant system comprising a surfactant, a cosurfactant and brine, said method comprising
    (a) analyzing water available for said system for $Na^+$, $Ca^{++}$, and $Mg^{++}$;
    (b) forming said brine with a $Na^+$ weight equivalent concentration equal to the actual weight percent $Na^+$ concentration plus about 14 times the $Ca^{++}$ concentration plus about 16 times the $Mg^{++}$ concentration, which puts the system in the three-phase region of a phase volume diagram of said system equilibrated with oil corresponding to that to be produced, or at least immediately adjacent to said three-phase region in systems exhibiting said three-phase behavior over a narrow range of salinity.

2. A method according to claim 1 wherein said $Na^+$ weight equivalent concentration is within the range of 800 to 20,000 parts per million by weight based on the weight of water in said brine.

3. A method according to claim 2 wherein the total divalent ion concentration is less than 500 parts per million by weight and said surfactant is a petroleum sulfonate.

4. A method according to claim 1 wherein said cosurfactant is at least one of isobutyl alcohol, secondary butyl alcohol, n-butyl alcohol, n-amyl alcohol, or isoamyl alcohol and mixtures thereof.

5. A method according to claim 1 wherein said sodium equivalent concentration is such that said system is within said three-phase region.

6. A method according to claim 1 wherein said three-phase region occurs over a sodium equivalent concentration of less than 1 percentage point.

7. A method according to claim 1 wherein said sodium equivalent concentration is within the range of 800 to 20,000 parts per million, the total divalent ion concentration is less than 500 parts per million by weight based on the water in said brine, said surfactant is a petroleum sulfonate having an average equivalent weight within the range of 390 to 425, and said cosurfactant is a $C_4$ or $C_5$ alcohol.

8. A method according to claim 1 wherein an initial surfactant composition on equilibration with oil corresponding to that produced results in a system in the alpha region of said phase volume diagram and wherein said surfactant system is produced by one of (A) using a lower $Na^+$ equivalent concentration relative to said initial surfactant composition, or (B) using a surfactant system having a smaller hydrophobic portion relative to said initial surfactant composition, or (C) using a more water-soluble cosurfactant relative to said initial surfactant composition.

9. A method according to claim 8 wherein said surfactant system is produced by using a lower $Na^+$ equivalent concentration.

10. A method according to claim 8 wherein said initial surfactant composition utilized a petroleum sulfonate as a surfactant and wherein said surfactant system is produced by using a sulfonate having a lower equivalent weight.

11. A method according to claim 8 wherein said surfactant system is produced by using a more water-soluble cosurfactant than in said initial surfactant composition.

12. A method according to claim 1 wherein said initial surfactant composition equilibrated with oil corresponding to that to be produced is in the gamma region of a phase volume diagram and said surfactant system is produced by at least one of (A) using a higher sodium equivalent concentration than in said initial surfactant composition, or (B) using a surfactant having a larger hydrophobic portion than in said initial surfactant composition, or (C) using a less water-soluble cosurfactant than in said initial surfactant composition.

13. A method according to claim 12 wherein said surfactant system is produced by using a higher $Na^+$ equivalent concentration.

14. A method according to claim 12 wherein said initial surfactant composition is produced utilizing a petroleum sulfonate and wherein said surfactant system is produced by using a higher equivalent weight sulfonate.

15. A method according to claim 12 wherein said surfactant system is produced by utilizing a less water-soluble cosurfactant than that utilized in said additional surfactant composition.

16. A process for recovering oil from a subterranean oil-bearing reservoir comprising the steps of:
  (a) injecting into said reservoir through at least one injection well a surfactant system comprising surfactant, cosurfactant and brine composed of water and electrolyte which surfactant system is tailored to both the specific water in the formation and the specific oil in the formation to give phase behavior associated with high oil recovery on equilibration with said oil said surfactant system being prepared using brine having $Na^+$, $Ca^{++}$ and $Mg^{++}$ with said brine having a $Na^+$ weight equivalent concentration equal to the actual $Na^+$ concentration plus the $Ca^{++}$ concentration times about 14 plus the $Mg^{++}$ concentration times about 16 so that said surfactant on equilibration with oil corresponding to that to be produced is in the three-phase region of a phase volume diagram or at least immediately adjacent said three-phase region in systems exhibiting three-phase behavior over a narrow range of salinity;
  (b) thereafter injecting a mobility buffer fluid behind said surfactant system; and
  (c) thereafter injecting a drive fluid behind said mobility buffer thus forcing said oil toward at least one recovery well.

17. A process for recovering oil from a subterranean oil-bearing reservoir comprising the steps of:
  (a) injecting into said reservoir through at least one injection well a surfactant system comprising a surfactant, cosurfactant, and brine, said surfactant system prepared by steps comprising:
    (1) analyzing water available for the system for $Na^+$, $Ca^{++}$, and $Mg^{++}$; and
    (2) forming said brine having a $Na^+$ weight equivalent concentration equal to the actual $Na^+$ concentration plus the $Ca^{++}$ concentration times about 14 plus the $Mg^{++}$ concentration times about 16, so that said surfactant on equilibration with oil corresponding to that to be produced is in the three-phase region of a phase volume diagram or at least immediately adjacent said three-phase region in systems exhibiting three-phase behavior over a narrow range of salinity; and
  (b) recovering said oil.

18. A method according to claim 17 wherein said sodium equivalent concentration is within the range of 800 to 20,000 parts per million by weight based on the weight of water in said brine.

19. A method according to claim 17 wherein the total divalent ion concentration is less than 500 parts per million by weight and said surfactant is a petroleum sulfonate.

20. A method according to claim 17 wherein said three-phase region occurs over a sodium equivalent concentration of less than 1 percentage point.

21. A method according to claim 17 wherein an initial surfactant composition on equilibration with oil corresponding to that produced results in a system in the alpha region of a phase volume diagram and wherein said surfactant system produced by one of (A) using a lower $Na^+$ equivalent concentration relative to said initial surfactant composition, or (B) using a surfactant system having a smaller hydrophobic portion relative to said initial surfactant composition, or (C) using a more water-soluble cosurfactant relative to said initial surfactant composition.

22. A method according to claim 17 wherein said surfactant system is produced by using a lower $Na^+$ equivalent concentration.

23. A method according to claim 17 wherein said initial surfactant composition utilized a petroleum sulfonate as a surfactant and wherein said surfactant system is produced by using a sulfonate having a lower equivalent weight.

24. A method according to claim 17 wherein said injection of said surfactant is preceded by preflush and wherein said surfactant system is produced by using a lower $Na^+$ equivalent concentration than in said initial surfactant composition.

25. A method according to claim 17 wherein an initial surfactant composition equilibrated with oil corresponding to that to be produced is in the gamma region of a phase volume diagram and said surfactant system is produced by at least one of (A) using a higher sodium equivalent concentration relative to said initial surfactant composition, or (B) using a surfactant having a larger hydrophobic portion relative to said initial surfactant composition, or (C) using a less water-soluble cosurfactant relative to said initial surfactant composition.

26. A method according to claim 25 wherein said surfactant system is produced by using a higher $Na^+$ equivalent concentration.

27. A method according to claim 25 wherein said initial surfactant composition was produced utilizing a petroleum sulfonate and wherein said surfactant system is produced by using a higher equivalent weight sulfonate.

28. A method according to claim 25 wherein said surfactant system is produced by utilizing a less water-soluble cosurfactant than that utilized in said initial surfactant composition.

* * * * *

UNITED STATES PATENT AND TRADEMARK OFFICE
CERTIFICATE OF CORRECTION

PATENT NO. : 4,122,895

DATED : October 31, 1978

INVENTOR(S) : Donald M. Sitton et al

It is certified that error appears in the above-identified patent and that said Letters Patent are hereby corrected as shown below:

Column 10, line 47, "claim 1" should be --- claim 8 ---.

Column 10, line 67, "additional" should be --- initial ---.

Column 12, line 10, after "system" and before "produced" should be --- is ---.

Column 12, line 17, "claim 17" should be --- claim 21 ---.

Column 12, line 20, "claim 17" should be --- claim 21 ---.

Column 12, line 25, "claim 17" should be --- claim 21 ---.

Signed and Sealed this

Ninth Day of March 1982

[SEAL]

Attest:

Attesting Officer

GERALD J. MOSSINGHOFF

Commissioner of Patents and Trademarks